Figure 3:
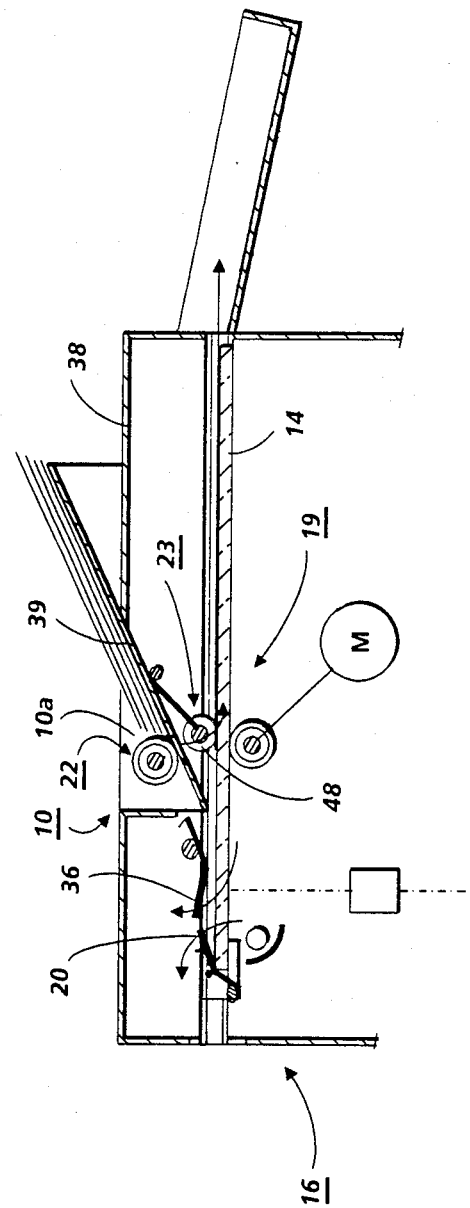

United States Patent [19]

Partilla

[11] Patent Number: 4,768,068
[45] Date of Patent: Aug. 30, 1988

[54] DOCUMENT FEEDER AND FLATTENER FOR MOVING PLATEN COPIERS

[75] Inventor: Stephen R. Partilla, Webster, N.Y.

[73] Assignee: Xerox Corporation, Stamford, Conn.

[21] Appl. No.: 75,479

[22] Filed: Jul. 20, 1987

[51] Int. Cl.⁴ .................... G03G 21/00; G03B 27/62
[52] U.S. Cl. ........................................ 355/75; 355/8; 355/77
[58] Field of Search ................ 355/14 SH, 50, 75, 77, 355/8

[56] References Cited

U.S. PATENT DOCUMENTS

| | | | |
|---|---|---|---|
| 3,288,459 | 11/1966 | Hitchcock et al. | 271/10 |
| 3,612,684 | 10/1971 | Jones et al. | 355/75 X |
| 3,888,581 | 5/1975 | Caldwell | 355/64 |
| 3,907,277 | 9/1975 | Robertson | 271/84 |
| 3,944,366 | 3/1976 | Robertson | 355/76 |
| 3,944,367 | 3/1976 | Hakanson et al. | 355/76 |
| 4,068,949 | 1/1978 | Booth et al. | 355/75 |
| 4,335,954 | 6/1982 | Phelps | 355/14 SH |
| 4,353,541 | 10/1982 | Parzygnat | 355/75 X |
| 4,367,947 | 1/1983 | Arter et al. | 355/75 |
| 4,368,977 | 1/1983 | Arter et al. | 355/75 |
| 4,429,866 | 2/1984 | Castro-Hahn | 271/266 |
| 4,639,128 | 1/1987 | Anderson | 355/75 |
| 4,660,957 | 4/1987 | Ueda | 355/3 SH |
| 4,721,981 | 1/1988 | Rauen et al. | 355/75 |
| 4,727,400 | 2/1988 | Ito | 355/75 |

FOREIGN PATENT DOCUMENTS 0145045  6/1985  European Pat. Off. ................ 27/62

OTHER PUBLICATIONS

Xerox Disclosure Journal, vol. 8, No. 3, May/Jun. 1983, pp. 199–200, "Document Ejector", by David F. Rauen.
Xerox Disclosure Journal, vol. 4, No. 4, Jul./Aug. 1979, pp. 521–522 "Moving Platen Copier with Document Eject", by R. G. Rush.

Primary Examiner—Fred L. Braun

[57] ABSTRACT

In a document handling system for a copier with a moving platen imaging system, wherein the platen is integral a moving platen unit reciprocally driven relative to the stationary body of the copier in a non-imaging movement and in an imaging movement for imaging a document sheet moving with the platen at a stationary narrow imaging station underlying the platen, including a document registration and clamping system adjacent one end of the moving platen unit and a system for opening and closing it to receive and clamp one end of the document sheet, a stationary document sheet input system for guiding the document sheet into the registration and clamping system while it is opened, and a narrow imaging backing plate, not moving with the moving platen unit, for closely and stationarily overlying only a minor portion of the platen to provide a light reflective imaging background surface optically overlying only the imaging station. A document sheet clamped on the platen is pulled under the imaging backing plate by the imaging movement of the moving platen unit. The imaging backing plate flattens the document sheet pulled thereunder down against the platen at the imaging position during the imaging movement, but has a lifting mechanism for automatically lifting it away from the platen during the opposite, non-imaging movement of the platen. A system is also provided for the document sheet to be automatically removed from the platen after it has been copied a desired number of times.

9 Claims, 3 Drawing Sheets

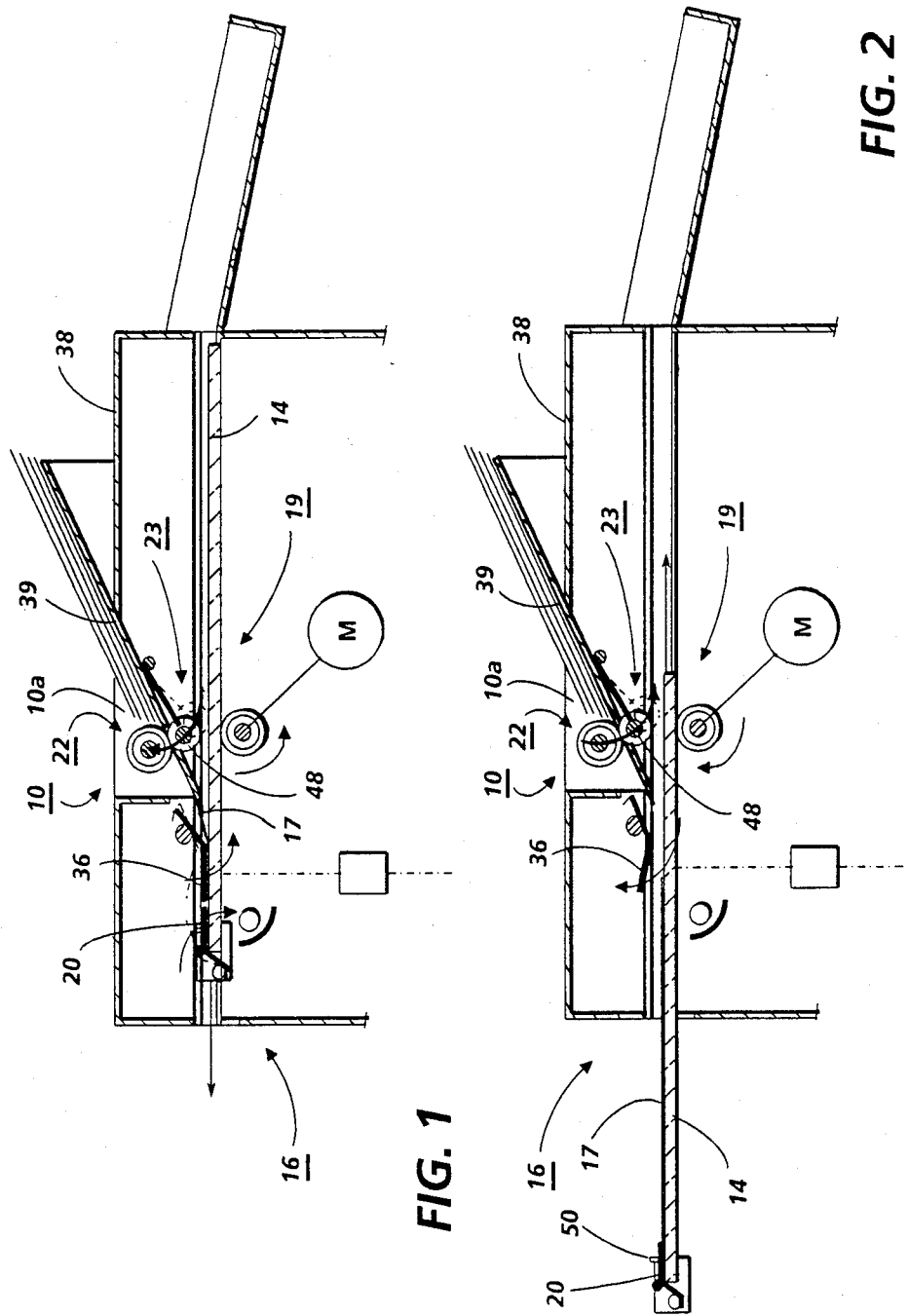

DOCUMENT FEEDER AND FLATTENER FOR MOVING PLATEN COPIERS

Hereby cross-referenced, and cited as potential U.S. prior art in the U.S., are the following two copending applications of the same assignee: Ser. No. 898,159, entitled "Document Feeder For Moving Platen Copiers", filed Aug. 19, 1986 now U.S. Pat. No. 4,707,113, by Troy Shinbrot and Youti Kuo; and Ser. No. 926,305, entitled "Low-Cost Document Feeder For Copiers", filed Nov. 3, 1986 now U.S. Pat. No. 4,721,981, by David Raun.

The present invention relates to an improved document sheet handler for a moving platen type copier with automated document handling and imaging provided compactly and at low cost, utilizing the existing platen movement and providing automatic document flattening at the imaging station.

By way of background, the art of original document sheet handling for copiers has been intensively pursued in recent years. Various systems have been provided for automatic or semiautomatic feeding of document sheets to be copied to and over the imaging station of the copier. The documents are normally fed over the surface of a transparent platen into a registered copying position on the platen, and then off the platen. Such automatic or semiautomatic document handlers eliminate the need for the operator to place and align each document on the platen by hand. This is a highly desirable feature for copiers. Document handlers also enable the full utilization or productivity of higher speed copiers, which cannot reliably be fed documents manually as fast as they can be copied. Lower cost, more compact, and lighter weight document handlers are particularly desired.

Various of the difficulties and problems in original document sheet handling are discussed in further detail in the references cited herein. These problems are much greater than for copy sheet feeding in many respects. Even related sets of original document sheets may vary considerably in weight, stiffness, size, material, age, friction, fuser oil or other surface coating, folds, curls, tears, smearable typing or printing, or other conditions. They may even have sprocket or binder holes. Yet document handlers must reliably overcome various, and often conflicting, requirements for reliable and timely document feeding and registration, with minimal document or platen glass wear, and without damage to valuable originals. Each document normally must be transported quickly without substantial skew or slippage, rapidly stopped in a precise desired or defined imaging position, usually with at least one edge of the document aligned with at least one edge of the platen, and then quickly reaccelerated after copying to eject the document from the platen into a restacking tray.

Even for smaller, lower cost, and slower copiers, it has become increasingly desirable to provide such mechanized or automated handling of documents. The documents may be automatically separated and sequentially fed from a stack of documents, or fed semiautomatically by an operator "stream feeding" individual documents into an input area of the document handler. In either case the document handler automatically does the final feeding and registration of the documents into and through the copying position, and then ejects the documents automatically. However, in such compact and low cost copiers, an appropriate document handler should also be simple, very low cost, lightweight and compact.

A document handling system preferably utilizes the existing or generally conventional copier optical imaging system of the copier on which it is mounted, including the external transparent copying window (known as the platen) of the copier. It is also desirable that a document handling system be readily removable, e. g., that it can be pivoted away from the platen by the operator, to allow the operator to manually place selected documents, such as books, on the same platen. A low mass document handler makes this lifting movement easier and safer, and reduces the need for counter-balancing springs.

A document handling system should provide a suitable white imaging background surface platen cover member overlying the platen against which documents can be copied without serious "show-through" or "show-around" copy defects (undesirable images from the document handler on the copy sheets). A document handling system should also flatten the document against the platen and thus maintain it in focus and provide uniform and undistorted copying. However, a suitably small spacing from the platen rather than direct contact may be desirable in some cases, to allow for document feeding. Noted, e. g., is U.S. Pat. No. 3,888,581 issued June 10, 1975 to John R. Caldwell, and the above cross-referenced U.S. Ser. No. 898,159.

The appropriate type of document transport and registration system is affected by the type of copier optics. In either a scanning (moving) optics system, or a full frame or flash imaging system, the platen is stationary, and the entire area to be copied must overlie the platen during copying and the document must be held stationary against the platen during copying. A stationary platen copier is more easily provided with automatic document handling than a moving platen copier.

In a moving platen system, to which the present system relates, the document is copied while both the platen and the document are being moved together. The document and platen move past a stationary optics (including illumination) system at a constant speed synchronized to the photoreceptor imaging surface speed. It is generally necessary in a moving platen system to manually preregister the document relative to the platen under a white platen cover covering the entire platen before the document is transported over the copying window. In a moving platen copier the entire platen unit is moved, then reversed in a higher speed return or "flyback" non-imaging movement before the next copying movement. One example of a platen drive system for a moving platen copier is illustrated in U.S. Pat. No. 4,190,349 issued Feb. 26, 1980 to Y. Ohno, et al. Another is in U.S. Pat. No. 3,737,223 issued June 5, 1973 to K. Yamamoto (Fuji Xerox Co.). A moving platen system allows a low cost copier imaging system, but has generally interferred with automatic document feeding and placement, with the exception of a few such systems as disclosed in art cited hereinbelow, and in and by the above-cited U.S. Ser. No. 898,159.

Furthermore, to reduce moving mass, since the platen covers must move with the moving platen, these platen covers are often of flexible rubber or other lightweight designs which may not adequately press down or clamp wrinkled or curled stiff documents.

It is important to distinguish a moving platen system from a CVT (constant velocity transport) system. In a CVT system the document sheet is moved by transport wheels or belts at a constant velocity over a narrow transparent scanning window or platen of the copier. CVT systems can have particular problems in maintaining a sufficiently accurate constant speed of the document with variations in document thickness, variations in deformable document feed roller diameters, or variations in frictional resistance to feeding between the document, the document feed rollers, and the platen glass. CVT systems can also have problems with wear or scratching of the platen glass from the documents or the feed rollers. Also, a CVT system does not allow alternative fully manual handling of the document, which is particularly desirable for valuable or delicate documents. CVT systems have difficulties copying books and other thick documents. CVT and other fixed platen document feeders can also have generated static electricity platen attraction and other document feeding problems, as discussed for example in U.S. Pat. No. 4,440,387 to Ikoma et al.

In a CVT document feeder the document sheet, regardless of its above-noted variations, must be forced to slide without lifting across a small stationary glass platen or slit at a constant velocity throughout the entire imaging of the document in order to provide proper imaging. This is in contrast to a moving platen copier, in which the document may be held down stationarily under an overlying platen cover against a full size flat glass platen unit, in a protective "sandwich", and that rigid, and much higher mass, platen unit is (more easily) transported at a constant velocity relative to the imaging station for imaging.

It is also known to provide a copier with more than one mode of document transporting, for example, to provide a receptacle in the nature of a moving platen for thick material such as books which can be driven by the same transport drive system which alternatively provides for constant velocity transporting of a normal document sheet, as exemplified by U.S. Pat. No. 4,530,591 issued July 23, 1985 to T. Mastuyama et al and U.S. Pat. No. 4,188,028 issued Feb. 12, 1980 (U.K. No. 2,005,640) to J. Miciukiewicz (Pitney Bowes) and art cited therein. A CVT with an alternative book carrier "platen", with rack and pinion drive, is also disclosed, for example, in Japanese Utility Model Application No. 54-15480 laid open June 18, 1981 as No. 56-74455, by Olympus Optical. A CVT system can also be combined into a copier alternatively providing a full size stationary platen. Such alternative CVT "stream feeding" input, especially useful for feeding and imaging documents which are larger than the platen, is provided, for example, in the Xerox Corporation "3100 LDC" copier (see, e.g., U.S. Pat. Nos. 3,900,258 and 4,017,172).

Of particular interest to the present invention is the following art, relating to previous attempts to provide some sort of document feeding or transporting for moving platen copying machines. As noted in European Patent Application Publication No. 0 145 045 published June 19, 1985, based on U.S. Ser. No. 542,289 filed Oct. 14, 1983, now abandoned, by J. C. Hamma (Gradco Systems, Inc.), original document feeders have not, in general, been applied to moving platen copying machines, as further discussed later below. It may be readily seen that the feeder proposed in this reference is more complex than the present system. Two other references noted as to document feeding for moving platen copiers are IBM Corporation U.S. Pat. Nos. 4,367,947 issued Jan. 11, 1983 to N. K. Arter et al and 4,368,977 issued Jan. 18, 1983 to N. K. Arter et al. Another, especially noted, is U.S. Pat. No. 4,660,957 issued Apr. 28, 1987 to N. Ueda, et al (Canon). Said U.S. Pats. Nos. 4,368,977 and 4,660,957 are particularly noted for a document ejecting roller powered from movement of the platen (the existing reciprocal scanning carriage movement), which may be utilized herewith, if desired. Another, much earlier, example of a semiautomatic document feeder for a moving platen copier is the Canon NP-155F document feeder product. A document handling device for a moving platen copier for photocopying documents such as billing statement ledger cards from a stack of such documents is disclosed in U.S. Pat. No. 4,068,949 issued Jan. 17, 1978 to R. A. Booth et al. Document sheet ejectors for ejecting documents from the platen of moving platen copiers, in addition to the above-cited IBM and other patents, are disclosed in Xerox Disclosure Journal publications Vol. 4, No. 4, July/August 1979, pp. 521–522 and Vol. 8, No. 3, May/June 1983, pp. 199–200.

Also of interest to features of this disclosure are document feeders with a document presser plate or clamp which may be raised or lowered to provide a platen clamp and image background plate for a copier, as illustrated in U.S. Pat. Nos. 3,944,366; 3,944,367; and 4,335,954. However, these latter three and U.S. Pat. No. 3,907,277 are all stationary platen copiers in which the clamp must be a large one covering the entire platen, and the document is stationary during copying.

Also noted is art on a reciprocating document feed, and document ejection, known for example from U.S. Pat. Nos. 3,288,459 and 3,907,277.

U.S. Pat. No. 4,429,866 issued Feb. 7, 1984 to V. Castro-Hahn, is noted for its rack and pinion rotating and translating document feed roller movement, and also for the disclosed wrapped wire or cord drive. However, this is for a constant velocity transport (CVT) copier in which the original document sheet is transported for copying by being slid over the glass of a fixed imaging station by this rotation and movement of the rollers.

The present invention is not limited to a particular or specific type of document illumination or optics system. However, it is particularly suitable for providing simple, low cost, compact and lightweight document handling for various types of moving platen type copiers, which has heretofore been difficult. These copiers usually have simple, stationary, optics.

The term "copier" as used herein is not intended to limit the invention to a xerographic or other conventional copier. It is also applicable to a document reader unit, for example, for an "EFE" or "electronic front end" for imaging document sheets and converting their images into transmittable and storable electronic signals, which may be reproduced elsewhere.

In a moving platen type copier, the movement of the platen unit precludes or interferes with the operation of a conventional stationary document feeder. A conventional feeder would be too large and heavy to easily, reliably, or safely move reciprocally with the moving platen unit, especially with the added weight of a document feeder drive motor. The added mass of a conventional document feeder, if it moved with the moving platen unit, could place an unacceptable acceleration and deceleration load upon the drive system for the moving platen carriage. A moving platen copier must accelerate the moving platen unit rapidly to a constant velocity and then decelerate rapidly at the end of the copying movement. The moving platen copier must then rapidly reverse the movement of the platen unit and move it back, at a much higher "flyback" speed, to its original position, rapidly stop the platen unit again, and then begin the scan for the next document or for the next copy of the same document, all as rapidly as possible. The added mass of a document feeder not only could interfere with these movements, it could actually cause uneven imaging movement of the platen unit, slippage or damage to the drive clutches, or even damage or wear to the platen unit drive. During the imaging movement the platen unit must move in precise synchronism with the imaging system. Uneven imaging movement of the platen unit would cause distortion of the image on the copy.

A particular problem with moving platen document copiers is the conforming of the documents to the platen in the vicinity of the exposure station. That is, maintaining the document fully flattened against the platen over the imaging area so as to insure that the entire area being imaged has a common focal length and common magnification, and to eliminate the effect of curls or wrinkles in the document sheet. As noted from the above-cited references, there are previously known ways in which this can be accomplished. One example is to provide rollers pressing down on the document adjacent the imaging area as used in CVT systems. However, these tend not to provide satisfactory imaging background surfaces due to uneven spacing from the platen outside of the actual nips, and surface contamination of the elastomeric roller or belt material. However, the normal platen cover for holding down and flattening the document on a moving platen copier is a large elastomer flexible platen cover or a rigid platen cover with an elastomeric lower surface, overlying the entire platen. Such covers hold the document in position for multiple copying, but do not allow for automatic document exchange. Each time a document is changed, the platen cover must be manually lifted, the document manually removed and the next document manually registered on the platen registration (copying) position and the platen cover closed, and all this must be done in between each copying run for the copier, seriously reducing the productivity of the copier.

A problem with document handlers in general is "show-through" or "show-around" defects, and document edge shadow or "border" defects. These occur where there is not a sufficiently white or planar background imaging surface overlying the entire imaging area. This is a particular problem for the edges of the document, i.e. to provide an imaging backing plate which extends beyond the edges of the document so that the entire document may be imaged without imaging a shadow area at an edge of the document, which prints out as a dark edge border defect on the copy.

It is well known in CVT systems to provide a small liftable white backing plate or clamp overlying the back of the document in the slit imaging area, e.g., Research Disclosure Publication No. 16063, August 1977, p. 54. However, these CVT systems require rollers at opposite sides of the backing plate or clamp/platen sandwich to hold the document therebetween, and the document has to slide relative to the platen glass. This is undesirable for several reasons. Furthermore, the rolls at the opposite sides of the clamp and platen tend to have uneven driving velocities. In any case, these systems are not readily adapted to a moving platen copier.

It is a general feature of the document handling system disclosed herein to provide an improved and automated document registration and copying system for use with a moving platen copier which overcomes various of the above-discussed problems, and combines various desirable features, in a very simple, economical and lightweight system. It may be readily seen that the document feeder disclosed herein, as compared to various of the references, is more compact and lighter and especially suitable for a document feeding unit for a moving platen unit copier.

A specific feature of the specific embodiment disclosed herein is to provide a document handling system for a copier with a moving platen imaging system, wherein the imaging platen of the copier is integral a moving platen unit reciprocally driven relative to the stationary body of the copier in a non-imaging movement and an imaging movement, for imaging a document sheet on said platen moving with said platen during said imaging movement at a stationary narrow scanning imaging station underlying said platen, the improvement comprising:

document registration and clamping means adjacent one end of said moving platen unit and moving therewith;

means for opening and closing said document registration and clamping means to receive and clamp one end of the document sheet at a registration position;

document sheet input means for guiding the document sheet into said document registration and clamping means while it is so opened, and into a copying position overlying said platen;

narrow imaging backing plate means, not moving with said moving platen unit, and movable relative to said platen into an imaging position closely and stationarily overlying only a minor portion of said platen at said imaging station for ironing the document at the imaging station;

said imaging backing plate means providing a light reflective imaging background surface optically overlying said imaging station in said imaging position;

said imaging backing plate means being adapted to allow a document sheet on said platen to be pulled under said imaging backing plate means by said imaging movement of said moving platen unit;

wherein said imaging backing plate means in said imaging position flattens the document sheet pulled thereunder for improved document imaging;

said imaging backing plate means further including lifting means for automatically lifting said imaging backing plate means away from said platen during said non-imaging movement of said moving platen unit;

and means for automatically removing the document sheet from said platen, after it has been copied.

Further features of the specific embodiment disclosed herein, individually or in combination, include those wherein: said lifting means for lifting said imaging backing plate means away from said platen during said non-imaging movement of said moving platen unit comprises automatic lifting means automatically coordinated with said reciprocal movement of said moving platen unit;

wherein said means for opening and closing said document registration and clamping means to receive one end of the document sheet is automatically coordinated with said reciprocal movement of said moving platen unit;

wherein said imaging backing plate means has a low friction planar white surface facing said platen and is coplanar with said platen and very closely overlying and/or directly engaging the entire area of the document sheet which is being imaged over said imaging station in said imaging position;

wherein said document registration and clamping means comprises a movable clamp member overlying the edge of said platen at which said imaging movement of said moving platen unit begins, and which overlies but does not underlie the document sheet which is being imaged, and therefore does not cause any image deletion;

wherein said imaging backing plate means and said document registration and clamping means are automatically maintained in their respective said imaging and closed positions until after the completion of a preselected number of said imaging movements of said moving platen unit;

wherein a document on the moving platen is reciprocally moved over an imaging station, comprising the steps of:

feeding a document sheet onto the platen into a registration edge position and clamping one edge of the document sheet adjacent the registration edge position before reciprocally moving the platen with the document so clamped thereto;

ironing the moving document down against the platen over only the imaging station to flatten wrinkles and curls in the document with a small stationary ironing member;

providing with said ironing member a substantially uniform imaging background surface fully overlying the imaging station, while pulling the document under said ironing member on said moving platen with continued said clamping in one direction of movement of said moving platen;

lifting said ironing member away from the document and the platen during the opposite movement of said moving platen;

and repeating the above steps to make plural copies of the document sheets;

wherein said ironing member is lowered automatically before beginning each image scanning movement of the platen and retracted automatically after the end thereof.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute known document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

The present invention overcomes or reduces various of the above-noted problems, and other problems discussed in said references.

Figure 4:
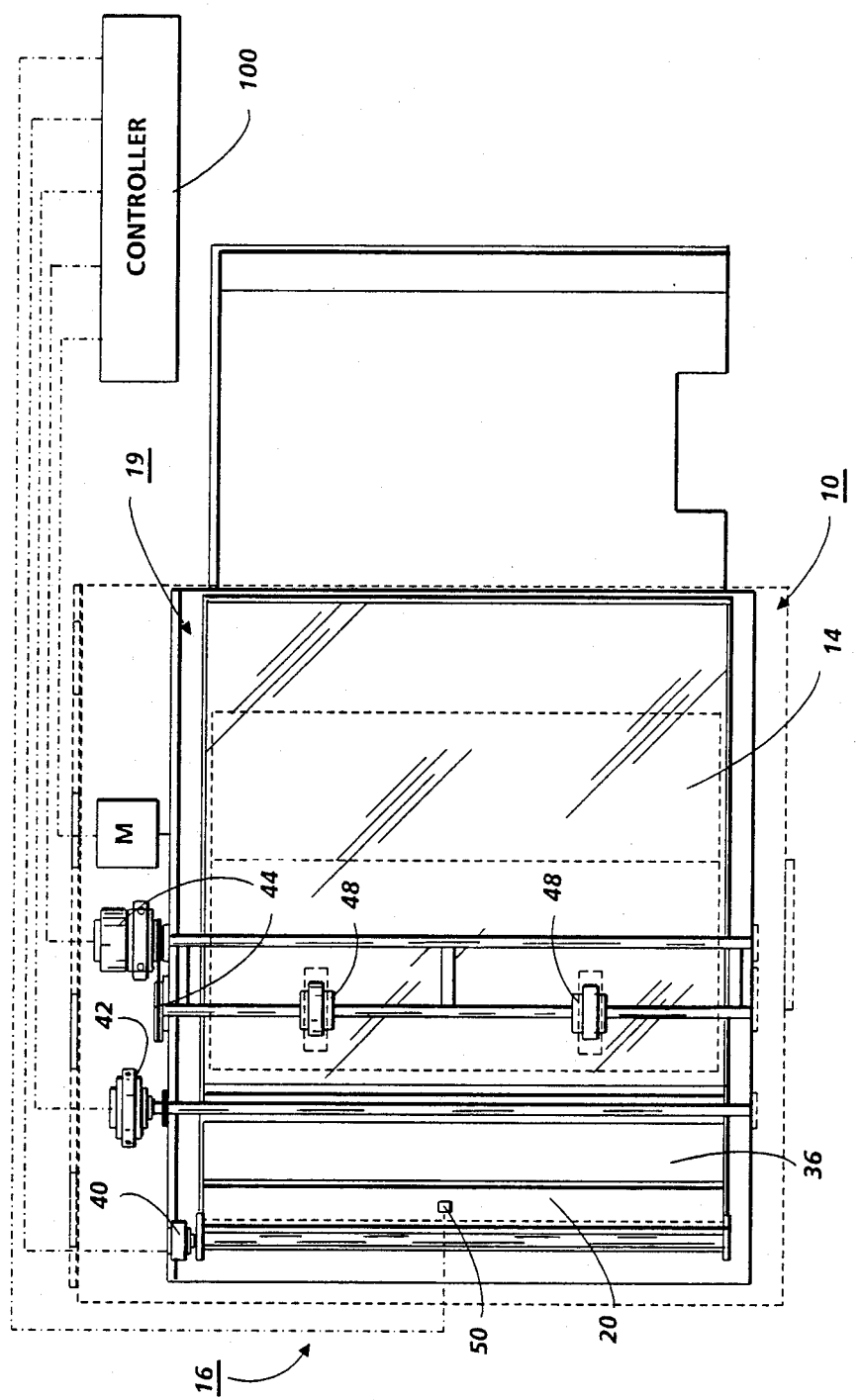

Various of the above-mentioned and further features and advantages will be apparent from the specific apparatus and its operation described in the examples below. The present invention will be better understood by reference to this description of these embodiments thereof, including the drawing figures (approximately to scale), wherein:

FIGS. 1-3 are common front views of one example of a document handler for a moving platen copier in accordance with the present invention; and wherein its operating positions are shown respectively for: just after document loading and start-of-scan (copying) in FIG. 1; just after the end of scan (the start of flyback) in FIG. 2; and just before the end of flyback and during document ejection and just before the loading of the next document in FIG. 3; and FIG. 4 is a top view thereof (with the external cover removed for drawing clarity).

Describing now in further detail the specific examples illustrated in the Figures, there is shown the relevant details of a new and improved document handling system 10 for sequentially handling document sheets to be copied on the moving platen 14 of a conventional moving platen copier 16. This document handling system 10 is adapted to automatically register each document sheet 17 at an appropriate registration position on the platen 14 of the moving platen unit 19. Registration is provided by an integral registration and clamping system 20 for engaging, stopping and deskewing, without damage, the lead edge of each document sheet 17 at an appropriate edge registration position on the platen 14.

The moving platen unit 19 includes a conventional platen 14 and is reciprocally mounted to the stationary body of the copier 16 by conventional slide bearings. Conventional frictional track or toothed rack drive means are provided for reciprocally driving the platen unit 19 over the stationary body of the copier 16. The rest or "home" position of the platen unit 19 is conventionally with the platen unit 19 aligned with the body of the copier 16. The "start-of-scan" position is, conventionally, with the left end or registration edge of the document at the imaging station. The imaging station is shown here by the dot-dash vertical axis center line of the optical path through the illustrated lens. The imaging area is a narrow slit adjacent that line extending across the platen 14. The end-of-scan and start of "flyback" position is, conventionally, where the document or the entire platen has fully scanned to the left.

The document handling system 10 illustrated here is exemplary, and may be readily modified for different moving platen copiers, including those with different platen unit motions than the exemplary copier 16 here. The exemplary copier 16 could be any moving platen imaging unit, for example, the well known "Canon PC-20" TM (or "PC-10 TM" or "PC-25 TM") small xerographic copier illustrated in, for example, U.S. Pat. No. 4,540,268 issued Sept. 10, 1985. Since the document handling system 10, or parts thereof, may be readily utilized with various conventional or appropriate moving platen copiers, the details of the copiers per se need not be described herein.

It will also be appreciated that the document handling system 10 disclosed herein may be variously utilized as or incorporated into, a semiautomatic or fully automatic (stack feeding), and/or recirculating document feeder, of which various examples have been provided in the references cited above, and their references.

Here, the moving platen unit 19 additionally includes one component of the document handling system 10, which is mounted thereon at one end and moves therewith, i.e., the small registration and clamping system 20. The rest of the document handling system 10 is stationary, i.e., does not move with the platen unit 19. It is preferably pivotably (and removably) mounted to the copier 16 by a disconnectable rear hinge, to the rear of the platen unit 19, so that it may be pivotably lifted up to provide manual document placement on, and access to, the platen 14, or removed completely. This stationary portion of the document handling unit 10 may be referred to as the cover assembly 10a.

There are no modifications required, or desired, for the conventional copier platen 14 or the conventional drive of the platen unit 19. There are no changes required in the conventional reciprocal motions of the platen unit 19. In fact, they are fully utilized, and not interfered with.

The document handling system 10 here includes a white backing plate or imaging surface member 36 mounted to the stationary assembly 10a. It is defined by a small, elongated rigid plate mounted to closely overlie the imaging area of the upper surface of the platen 14 in operation. This plate 36 is adapted to allow documents to be pulled thereunder during imaging. This plate 36 serves in lieu of a conventional platen cover to hold the documents to within the depth of focus of the copier optics, yet allows their imaging movement. This imaging surface member 36 and other components may be hidden under the enclosing DH housing 38 forming the cover of the assembly 10a, as shown in FIGS. 1-3. This cover is shown removed (is not shown) in FIG. 4 for illustrative clarity. Note that this DH assembly 10a including cover unit 38 does not move here, and therefore does not improve any mass or load on the platen movement. It provides several functions, as described.

The operative power and actuation for the document handling system 10, providing the document feeding, the document registration, the document imaging movement, and the document ejection, may all optionally be provided here by motion converting systems connecting between the stationary body of the copier 16 and the moving (driven) platen unit 19. That is, the motion power may from the existing drive "M" of the platen unit 19. In that case, no separate drives or motors are required, thus saving mass, cost, space and complexity. Here, however, in the illustrated embodiment, for simplicity, small conventional rotary solenoids 40 and 42, or motors, actuated by the conventional controller 100, respectively provide the desired movement of the clamping system 20 and plate 36, as shown in FIG. 4. As also shown in FIG. 4, a small conventional motor/belt drive 44 rotates feed wheels 48. This is a dual mode unit alternatively providing, in two different positions of the feed wheels 48, sheet loading for the document input system 22 and sheet ejection by an output roller system 23. The drive 44 here may have a common shaft-geared speed reducer output and clutch to also provide for rotation of the arm on which the rollers 48 are mounted.

There is disclosed herein, and desirably provided as an additional feature, an input roller and guide system 22. This is illustrated here by a conventional loading tray or input chute 39 integral the DH housing 38, from which document sheets may be separated and individually fed from a stack thereof by the illustrated conventional bottom feed retard separator/feeder, as in FIG. 1, utilizing said driven feed rollers 48, for automatically feeding the inputted document into the registration and clamping system 20. Furthermore, there is preferably additionally provided an output or ejecting system 23 for ejecting the document automatically after it is copied. These two features per se are taught by above-cited references on document handlers for moving platen copiers and various others. As illustrated herein, the same feed wheel or wheels 48 and drive 44 provide both. The wheels 48 pivot up for feeding into the illustrated retard nip through two apertures in the input tray or chute 39 as shown in FIG. 4 and then down to the platen for document ejection as in FIG. 3.

The input system 22 automatically feeds a document onto the platen into the simple document edge clamp provided by the registration and clamping system 20. This is preferably located at the conventional registration edge of the platen 14. This is, conventionally, the start-of-scan position for the copier, i.e., the position on the platen from which the actual imaging or start-of-scan begins during the imaging movement of the platen 14.

The registration and clamping system 20 here does not cause any image deletions or copy defects because it simply presses the edge of the document down against the platen glass from above the platen, and preferably has a white surface facing the platen. A small lead edge area of the document sheet is captured between this clamp and the platen surface, (not between elements of the clamp, which would obscure or prevent imaging of any of the document). This clamp is automatically opened during the feeding in of the document and during the document ejection, (see FIG. 3) by an opening mechanism. It could be actuated by the movement of the platen itself, but here it is lifted open by solenoid 42 (FIG. 4). The clamp is automatically closed during the imaging movement to retain the document in position, (FIG. 1) and also so as to be able to pull the document without slippage relative to the platen under the white backing or imaging surface member 36, which is pressed against the document during imaging and is stationary. That is, both the platen 14 and the document sheet 17 thereon are together pulled under the overlying backing plate 36 during imaging (FIG. 1).

Since this exposure backing plate 36 is stationary, i.e., is mounted to the stationary cover or body of the copier and not the moving platen unit, it remains overlying the image station, i.e., the optics slit. But since it only needs to overlie the relatively narrow area of the imaging station of a moving platen copier, the plate 36 is a narrow elongate member. The plate 36 extends across the platen (see FIG. 4) at the imaging slit area only, i.e., not covering the entire platen as with a normal platen cover or clamp.

The possibility of "show-around" or other border defects on the copy is greatly reduced because, at all times, the copier optics "sees" only the document or the uninterrupted white planar surface of the backing member 36, regardless of the size of the document being copied. In contrast, a platen cover of the conventional type moving with the document must be larger than the largest document to be copied, or edge defects can be produced.

During imaging, the document 17 is held stationary relative to the platen solely by its clamping against the platen at the upstream end thereof by the registration and clamping system 20, which moves with the platen and the rest of the moving platen unit. Yet flattening of the document, and pressing down into the imaging area of the document, is provided by the fixed backing surface member 36. Since this backing surface member 36 is fixed and the document and platen start their movement relative to the surface member 36 from adjacent the registration and clamping system 20 here, and the clamp moves away with the edge of the document being clamped, the document sheet 17 is always being pulled during imaging relative to the surface member 36. Thus, the lowered plate 36 slightly tensions the document during the imaging movement thereof and thereby aids in flattening out wrinkles or corrugations in the document in the exposure area. The lower surface of member 36 acts like the sole plate of an iron to actually temporarily "iron" out wrinkles in the sheet.

During the opposite, non-imaging, movement of the moving platen unit 19, the surface member 36 is automatically lifted up away from the document and the platen, as shown in FIGS. 2 and 3. This may be by approximately 2 centimeters clearance from the platen, for example, or more. Thereby there is no resistance or drag on the document, and thus no possibility of buckling the document, even though the document is now being pushed towards the member 36 by the clamping system 20. The document may be readily removed as soon as the registration clamping system 20 releases the document. Document removal is shown in FIG. 3 nearing its completion. Likewise, there is no interference with the loading of the next document onto the platen. This raised position of the member 36 is its initial, or loading, and final, or rest, position also. Furthermore, if it strikes an obstruction it can pivot out of the way in the same manner. The surface member 36 automatically lowers into its operating position before the next imaging movement. To reiterate, the imaging background and clamping member 36 is automatically lifted out of the way of the document, away from the platen, for all non-imaging movements of the platen, which can be the return or "flyback" or other rescan movements, or the return to the rest or home position.

Since the backing surface member 36 lifts during all rescan or "flyback" movements of the moving platen unit 19, there is no drag or other interference with reverse movements of the document past the backing surface member 36, and no interference with the document registration position. Thereby consecutive multiple copies can be made in consecutive scans of the same document without changing its position relative to the platen or removing it from the platen and refeeding it, unlike many document feeders.

The feature of self straightening and flattening of the document in only one direction of movement (the scanning movement), and only pulling on the document, is desirable for handling lightweight and delicate original documents such as "onion skin" paper as well as stiffly curled or wrinkled thick documents.

The clamping system 20 is automatically released on the last flyback, after the total number of copies selected have been made. When both the clamp and the surface member 36 are lifted, the document can be readily removed by the output roller system 23 or other document ejection system, because there is then no substantial resistance to document movement relative to the platen. There is nothing holding the document sheet to the platen in that mode, so the rollers 48 can frictionally drive it off the platen rapidly to a catch tray as shown in FIG. 3.

The backing surface member 36 may be spring-loaded or gravity-loaded to ride directly on the back of the document during imaging. However, alternatively, it may be maintained slightly spaced above the platen and document. Spacing pads or bearings at opposite ends thereof may maintain a small preset spacing, for example, a spacing of approximately 0.25 mm uniformly above the upper surface of the platen. That close spacing will reduce the friction with the document and yet sufficiently press curled or wrinkled areas of the document down to within the depth of focus of the copier optics.

Because this backing or imaging surface member 36 may be quite small, e. g., less than 8 cm wide and 28 cm long, and made of a low friction nonelastomeric material, such as a white aluminum plate, it is easier to clean than a typical document handler's elastomeric frictional feeding belt or rollers, and does not need to maintain a narrow range of high frictional properties to function properly.

As noted, various systems for actuating both the clamping system 20 and the lifting (out of its operative position) of the backing surface member 36 may be employed to achieve the above-described functions. The existing reciprocal motions of the moving platen unit 19 may be utilized to mechanically cam these movements, rather than using electromechanical or electromotive actuators to open and close these two members. Cam surfaces may be provided at the appropriate positions on the stationary body of the copier to be intersected by, and actuate, cam followers on the moving platen unit 19 (i.e., in the paths thereof) during the reciprocal movement of the moving platen unit 19.

The clamping and registration system 20 holds the lead edge of the document against the document registration edge or guide of the platen during imaging, and the registration edge may form or be a part of the clamp. For multiple copies the clamp preferably continues to hold the document lead edge during all the return or flyback movements as well, until the final one, but this is not essential. Thus, for plural copies, solenoid activated clamping, as shown here, is preferred so that the clamp can be maintained closed. However, it is preferred that the clamp be maintained released (open) in the neutral, ready, or loading position and state of the copier, and at the end of copying, and whenever power for the copier is removed or shut off, to insure release of the document in all those states of the copier.

In the embodiment here, as, or before, the platen unit 19 makes its conventional initial movement (from its "home" position out to the "start-of-scan" position) the document to be copied is fed in and acquired from the operator (directly or automatically from a stack in the input tray 39) and may be automatically driven onto the platen 14 and into the open clamp by a distance which brings it up to at least the registration position. Here that is at or adjacent the upstream end of the platen. The document sheet is fully fed onto the platen and registered by the end of the initial or prescan movement of the platen. This initial document feeding may be provided or assisted by the illustrated input roller system 22, or others, various of which are known in the art.

Then, during the next (reverse) movement of the platen unit 19, scanning imaging of the document 17 on the platen 14 takes place. They move together, with no movement of the document 17 relative to the platen 14. If more than one copy was selected (by the conventional copier copy count selector), the copier controller keeps that document sheet on the platen until all the selected number of copies have been made. Thus, repeated scanning and flyback cycles can be made without removing and replacing that document. When the last selected copy has been made and the platen unit 19 motion reverses again (i.e., during its last "flyback" movement), the ejector system 23 or other ejection means are engaged, to rapidly eject that document from the platen 14, in preparation for feed-in of the next document. Note that after the last copy, the "flyback" movement of the platen unit 19 is only to the "home" position, rather than back to the start-of-scan position. The document ejection drive time and distance accommodates either of the platen movement distances.

If desired, the next document to be copied may be fed onto the platen simultaneously with the feeding off of the preceding document. Conventional individual document sheets are illustrated as being sequentially fed and registered, but a wide variety of document sizes can be handled. The clamp entrance may have lead in baffles, guides or chutes as shown, or otherwise, to assist loading the document into the clamp and up to the normal registration edge guide. The clamp may also be transparent or apertured to provide for a lead edge document sensor 50, such as illustrated in FIG. 4, of a known type, to indicate the input of a document to be copied and even to start the copier.

The electrical control here, illustrated by the controller 100 in FIG. 4, may be simple on-off or "and" circuits or switches instead of software programmed logic. They may be connected, for example, with an input document sensing switch such as 50 and/or the existing "start" signal circuit and the zero copy count in the copy counter display or the job end logic signal of the copier (the signal indicating that no selected copies remain to be copied). The input document sensing switch 50 may be connected in electrical parallel with the existing "start" switch on the copier so as to automatically start the copier in response to a document being inserted, without need for the operator to actuate the "start" switch on the copier, but equally responsive to that also. An alternative, known, type of control can be switches actuated by the respective movements of the platen unit by appropriate positioning of the switches or their actuating cams in the path thereof. Alternatively, or additionally, the motion reversal signal to the platen drive motor "M" or its clutch, if it has one, can be tapped.

Numerous ways of providing the specified movements and times of lifting and lowering of the backing surface member 36 will be apparent to those skilled in the art from the cited art and otherwise. The example shown here is a simple eccentric rotation about hinge axis above the platen by a solenoid 42 arrangement. The member 36 may be loaded down with the desired normal force by its weight, and/or with an over-center spring which can also alternatively hold it up. This "ironing" member 36 here is pivotably attached by an angular plate extension of the downstream side thereof to the fixed housing 38 overlying the platen unit 19 here. However the housing 38, and all of the assembly 10a of the document handler, is pivotably mounted to the body of the copier so that it may be lifted up to provide alternative manual access to the platen and alternative document placement thereon, especially for thick documents such as books. Thus, when the housing 38 is pivotably lifted, the member 36 will lift out of the way with it. The simple solenoid actuator 42 (also in the housing 38) may connect with the member 36 to pivot it down during image scanning. The member 36 may be spring-loaded to retract unless this solenoid 40 is actuated. As noted, cam actuators may be used instead.

For book copying, the clamp 20 is maintained in its open position, and is preferably spaced sufficiently to allow such a thick document edge to be placed under the clamp. Thereby the substantially vertical inner wall of the clamp 20 may be used as the document lead edge registration edge guide for both manual and automatic document placement, if desired.

As noted, the housing 38 here also provides an integral input guide or loading chute 39 for guiding documents being loaded into the document handling unit into the clamping and registration system 20, when the latter is in its initial position. The downstream extension of the member 36 here is shaped to form a part of this sheet guiding input loading path when it is raised. It may also be provided with another extension (not shown) to a function as a gate to block feeding of further documents when it is lowered. As noted, feed wheels or belts for this input system 22 may be optionally additionally provided in a known manner, not limited to the system shown here.

The clamping system 20 can be directly solenoid actuated by a solenoid unit 40 moving therewith on the end of the moving platen unit 19, as illustrated here. That solenoid may be connected by a known flexible and retractable electrical flat cable, for example, to the copier and its electrical controller 100. Alternatively, a solenoid in the body of the copier may be actuated to retract or extend cam tracks at opposite sides of the platen unit path. These cam tracks may be normally spring-loaded up to engage and lift open the clamp 20, which may be spring-loaded closed except when being opened by the cam. By this, or various other systems, whenever power is removed from the solenoid the clamp will open. Also, the clamp here is pivoting, but it could be vertically movable instead.

With the particular exemplary moving platen copier 16 identified herein, there is an initial prescan movement of the moving platen unit 19. This is an initial movement of the moving platen unit 19 from its "home" position (where it is aligned over the body of the copier) to an upstream "start-of-scan" position. This movment is in the same movement direction as the postscan "flyback" movement. It is possible, however, to have a moving platen copier that does not have a prescan movement, in which the home position is also the start-of-scan position.

In conclusion, the document handling system 10 may be constructed and operated at very low cost. It is very light in weight, and therefore does not overload a conventional platen unit drive. None, or very little, of the system has to move with the platen. It is easily pivotably mounted over a conventional copier platen so that it can be lifted away from the platen for alternative manual document placement, registration and copying, or removed completely. It can provide reliable automatic feeding of documents in rapid sequence, closely spaced from one another, at the full copying rate of the copier. It allows multiple copies to be made of a selected document sheet without requiring the refeeding and reregistering of the document sheet to be recopied. It provides reliable and accurate registration with protection from document damage. It provides positive and improved flattening and hold-down of the document during its copying movement. It does not introduce "show-around" or "show-through" copy defects. It provides easy jam access and clearance. Thus, it is uniquely suitable for small, low cost, moving platen copiers, for which low cost automatic document handling was heretofore difficult.

While the embodiments disclosed herein are preferred, it will be appreciated from this teaching that various alternatives, modifications, variations or improvements therein may be made by those skilled in the art, which are intended to be encompassed by the following claims:

What is claimed is:

1. In a document handling system for a copier with a moving platen imaging system, wherein the imaging platen of the copier is integral a moving platen unit reciprocally driven relative to the stationary body of the copier in a non-imaging movement and an imaging movement, for imaging a document sheet on said platen moving with said platen during said imaging movement at a stationary narrow scanning imaging station underlying said platen, the improvement comprising:
   document registration and clamping means adjacent one end of said moving platen unit and moving therewith;
   means for opening and closing said document registration and clamping means to receive and clamp one end of the document sheet at a registration position;
   document sheet input means for guiding the document sheet into said document registration and clamping means while it is so opened, and into a copying position overlying said platen;
   narrow imaging backing plate means, not moving with said moving platen unit, and movable relative to said platen into an imaging position closely and stationarily overlying only a minor portion of said platen at said imaging station for ironing the document at the imaging station;
   said imaging backing plate means providing a light reflective imaging background surface optically overlying said imaging station in said imaging position;
   said imaging backing plate means being adapted to allow a document sheet on said platen to be pulled under said imaging backing plate means by said imaging movement of said moving platen unit;
   wherein said imaging backing plate means in said imaging position flattens the document sheet pulled thereunder for improved document imaging;
   said imaging backing plate means further including lifting means for automatically lifting said imaging backing plate means away from said platen during said non-imaging movement of said moving platen unit;
   and means for automatically removing the document sheet from said platen, after it has been copied.

2. The document handling system for a copier with a moving platen imaging system of claim 1, wherein said lifting means for lifting said imaging backing plate means away from said platen during said non-imaging movement of said moving platen unit comprises automatic lifting means automatically coordinated with said recirocal movement of said moving platen unit.

3. The document handling system for a copier with a moving platen imaging system of claim 1, wherein said means for opening and closing said document registration and clamping means to receive one end of the document sheet is automatically coordinated with said reciprocal movement of said moving platen unit.

4. The document handling system for a copier with a moving platen imaging system of claim 1, wherein said imaging backing plate means has a low friction planar white surface facing said platen and is coplanar with said platen and very closely overlying and/or directly engaging the entire area of the document sheet which is being imaged over said imaging station in said imaging position.

5. The document handling system for a copier with a moving platen imaging system of claim 1, wherein said document registration and clamping means comprises a movable clamp member overlying the edge of said platen at which said imaging movement of said moving platen unit begins, and which overlies but does not underlie the document sheet which is being imaged, and therefore does not cause any image deletion.

6. The document handling system for a copier with a moving platen imaging system of claim 1, wherein said imaging backing plate means and said document registration and clamping means are automatically maintained in their respective said imaging and closed positions until after the completion of a preselected number of said imaging movements of said moving platen unit.

7. The document handling system for a copier with a moving platen imaging system of claim 6, wherein said document registration and clamping means comprises a movable clamp member overlying the edge of said platen at which said imaging movement of said moving platen unit begins, and which overlies but does not underlie the document sheet which is being imaged, and therefore does not cause any image deletion;
   wherein said means for opening and closing said document registration and clamping means to receive one end of the document sheet is automatically operative in response to said reciprocal movement of said moving platen unit; and
   wherein said imaging backing plate means has a low friction planar white surface facing said platen and coplanar with said platen and very closely overlying and/or directly engaging the entire area of the document sheet which is being imaged in said imaging position.

8. A method of plurally copying a document sheet in a moving platen copier wherein a document on the moving platen is reciprocally moved over an imaging station, comprising the steps of:
   feeding a document sheet onto the platen into a registration edge position and clamping one edge of the document sheet adjacent the registration edge position before reciprocally moving the platen with the document so clamped thereto;
   ironing the moving document down against the platen over only the imaging station to flatten wrinkles and curls in the document with a small stationary ironing member;
   providing with said ironing member a substantially uniform imaging background surface fully overlying the imaging station, while pulling the document under said ironing member on said moving platen with continued said clamping in one direction of movement of said moving platen;

lifting said ironing member away from the document and the platen during the opposite movement of said moving platen;

and repeating the above steps to make plural copies of the document sheets.

9. The method of claim 8 wherein said ironing member is lowered automatically before beginning each image scanning movement of the platen and retracted automatically after the end thereof.

* * * * *